March 25, 1924.          J. A. PICKENS          1,488,435
MEASURING DEVICE
Filed Aug. 27, 1920
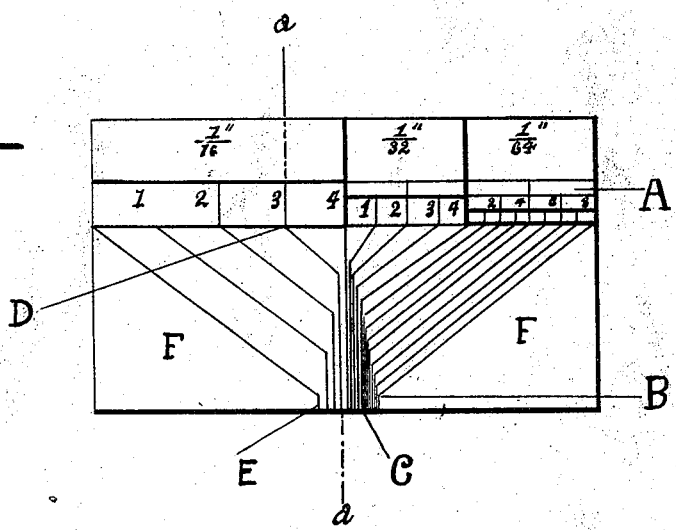
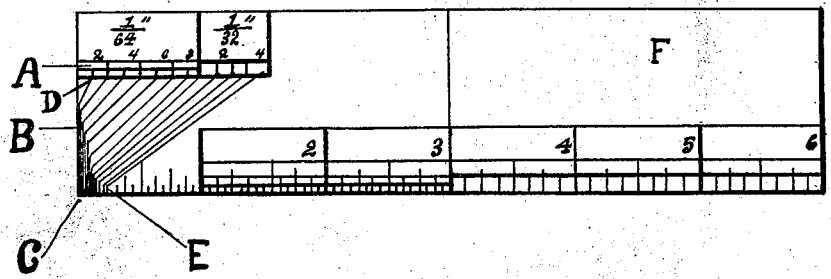
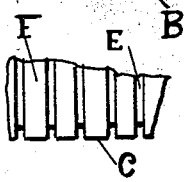
Witnesses:
S. H. Bauer
N. A. Bryant
Inventor
Julius A. Pickens Patented Mar. 25, 1924.

1,488,435

UNITED STATES PATENT OFFICE.

JULIUS A. PICKENS, OF EASLEY, SOUTH CAROLINA.

MEASURING DEVICE.

Application filed August 27, 1920. Serial No. 406,369.

*To all whom it may concern:*

Be it known that I, JULIUS A. PICKENS, a citizen of the United States, residing at Easley, in the county of Pickens and State of South Carolina, have invented certain new and useful Improvements in Measuring Devices, of which the following is a specification.

This invention has relation to graduated instruments used in the measurement of distances, and has as its object the making legible to the unaided eye minute graduations of measurement.

This invention consists of graduations having the distance between them geometrically expanded in a manner so that at the dial the distance between said graduations has become a multiple of what said distance is at the measuring-edge or measuring surface, and it is applicable to every variety of measuring device; altho it will suffice here to describe the invention as adapted to linear measurement.

That an understanding be had thereof, attention is directed to the accompanying drawing that illustrates the application of this invention as being adapted to linear measurement.

In the drawing—Fig. 1 shows the minute graduations as having the distance between them geometrically expanded so that at the dial the distance between said graduations has become a multiple of the distance as it is between said graduations at the measuring-edge; Fig. 2 illustrates the application of this invention to the face of an instrument for linear measurement; Fig. 3 is a sectional view on line *a—a* on an enlarged scale of Fig. 1; Fig. 4 is a magnification of the measuring-edge and shows the graduations as grooves discontinued short of the measuring-edge so that the measuring-edge is notched or toothed with indentations whose walls are perpendicular to the measuring-edge, said indentations having walls separated by a distance equal to the width of the distance between the lines with the lines that form the width of said graduations.

In the drawing forming a part of this specification, F represents the body of the instrument, C the measuring-edge, B the points where the distances between the graduation lines become divergent; D is an angle where the diverged graduations turn to enter the dial, and A is the dial.

In the practical application of this invention the graduations are depressed or stamped channels as disclosed by Figs. 3 and 4, and are read by means of tracing with a stylus the graduations coinciding with limits to be measured.

To facilitate the entrance of the point of the stylus into the channel of the desired graduation, the measuring-edge C is toothed or indented and beveled as shown in Figs. 3 and 4.

It is to be understood that I am not to be limited to the specific features of construction and arrangement which I have illustrated and described, as these features can be departed from to attain the fan-wise expansion of the distance between the graduations, and yet remain within the scope of the claims appended hereto.

Having thus described my invention, what I claim as new and desire to have secured by Letters Patent, is:

1. In a measuring device provided with a calibrated dial and a serrated measuring edge having channeled graduation lines commencing in said serrations and extending parallel from said measuring edge for consecutively varying distances to points of divergence, thence from said points of divergence said channeled graduations extend fan-wise to said calibrated dial, substantially as described.

2. A measuring device provided with a calibrated dial, a serrated measuring edge, channels extending from said serrated measuring edge to points varing consecutively in distance from said serrated measuring edge and channels, extending fan-wise from said points to said calibrated dial, substantially as specified.

3. In a measuring device provided with a calibrated dial and a serrated measuring edge, said calibrated dial being of greater length than said serrated measuring edge and said calibrated dial having communication with said serrated measuring edge thru and by traceable graduation lines, substantially as described.

In testimony whereof I affix my signature.

JULIUS A. PICKENS.

Witnesses:
S. H. BOWEN,
A. A. BRYANT.